United States Patent
Kayama et al.

(10) Patent No.: US 7,777,129 B2
(45) Date of Patent: Aug. 17, 2010

(54) TITANIUM OXIDE FOR DYE-SENSITIZED SOLAR CELLS

(75) Inventors: Susumu Kayama, Toyama (JP); Hisao Kogoi, Toyama (JP); Jun Tanaka, Chiba (JP)

(73) Assignee: Showa Denko K.K., Tokyo (JP)

( * ) Notice: Subject to any disclaimer, the term of this patent is extended or adjusted under 35 U.S.C. 154(b) by 1510 days.

(21) Appl. No.: 10/529,751

(22) PCT Filed: Sep. 30, 2003

(86) PCT No.: PCT/JP03/12554

§ 371 (c)(1),
(2), (4) Date: Mar. 30, 2005

(87) PCT Pub. No.: WO2004/028970

PCT Pub. Date: Apr. 8, 2004

(65) Prior Publication Data

US 2006/0046504 A1     Mar. 2, 2006

Related U.S. Application Data

(60) Provisional application No. 60/416,919, filed on Oct. 9, 2002, provisional application No. 60/489,109, filed on Jul. 23, 2003.

(30) Foreign Application Priority Data

| Sep. 30, 2002 | (JP) | ............................. 2002-285334 |
| Jun. 13, 2003 | (JP) | ............................. 2003-169421 |
| Jul. 16, 2003 | (JP) | ............................. 2003-197672 |
| Sep. 11, 2003 | (JP) | ............................. 2003-320123 |

(51) Int. Cl.
*H01L 31/00* (2006.01)
*B02C 19/00* (2006.01)

(52) U.S. Cl. ............................. 136/263; 241/5; 241/21; 241/30

(58) Field of Classification Search ................. 136/263; 241/5, 21, 30
See application file for complete search history.

(56) References Cited

U.S. PATENT DOCUMENTS

| 5,489,466 A | 2/1996 | Inaba et al. |
| 5,789,592 A | 8/1998 | Gratzel et al. |
| 6,623,129 B2 * | 9/2003 | Fujimori ..................... 353/122 |
| 2001/0043904 A1 | 11/2001 | Tanaka et al. |

FOREIGN PATENT DOCUMENTS

| EP | 0 847 961 A1 | 6/1998 |
| JP | 11-43327 A | 2/1999 |
| JP | 2001-283942 A | 10/2001 |
| JP | 2001-357899 A | 12/2001 |
| JP | 2002-83987 A | 3/2002 |
| WO | WO 03 048048 A | 6/2003 |

OTHER PUBLICATIONS

Begin-Colin, S. et al, "Kinetics and Mechanisms of Phase Transformations Induced by Ball-Milling in Anatase TiO2" J. Solid State Chem. 149, 41-48. (2000).*

(Continued)

*Primary Examiner*—Jeffrey T Barton
(74) *Attorney, Agent, or Firm*—Sughrue Mion, PLLC

(57) ABSTRACT

A dye sensitized solar cell comprising, as the dye electrode, a titanium oxide structure having an optical band gap (hereinafter referred to as "BG") of 2.7 to 3.1 eV as calculated from absorbance measured by an integrating sphere-type spectrophotometer, or a metal oxide structure obtained by dry-mixing a plurality of metal oxide powder particles differing in the particle size or a metal oxide dispersion thereof, wherein assuming that the BG of raw material metal oxide is BG0 and the BG of metal oxide after the dry mixing is BG1, the (BG0-BG1) is from 0.01 to 0.45 eV, and a production method thereof are provided.

9 Claims, 3 Drawing Sheets

OTHER PUBLICATIONS

Barbe, et al., "Nanocrystalline Titanium Oxide Electrodes for Photovoltaic Applications", J. Am. Ceram. Soc., vol. 80 No. 12, 1997, pp. 3157-3171.

M. Kiyono, "Sanka Titan", (Titanium Oxide) (1991), pp. 54-55.

"Sentan Koukinouzairyo", vol. 6, Denjikiteki Kinouzairyo 2 Denchizairyo, 2001, NGT Corporation, pp. 439-447.

* cited by examiner

TITANIUM OXIDE FOR DYE-SENSITIZED SOLAR CELLS

CROSS REFERENCE TO RELATED APPLICATION

This application is an application claiming benefit pursuant to 35 U.S.C. §119(e)(1) of the filing date of the Provisional Application No. 60/416,919 filed on Oct. 9, 2002, and the filing date of the Provisional Application No. 60/489,109 filed on Jul. 23, 2003, pursuant to 35 U.S.C. §111(b).

FIELD OF THE INVENTION

The present invention relates to a method for producing a titanium oxide-containing metal oxide structure, which is suitably used for solar cells and the like.

DESCRIPTION OF RELATED ART

At present, silicon-type solar cells are predominating as the solar cell but in view of use of harmful raw materials, high production cost and the like, studies are being made to develop new-style solar cell.

One of solar cells thus developed is a dye sensitized solar cell and since Graetzel et al. of EPFL-Lausanne reported it in 1991 (see, for example, Japanese Unexamined Patent Publication (Kokai) No. 2001-283942), this cell is being studied and developed as an alternative to the silicon-type cell.

The dye sensitized solar cell in general has a structure shown in FIG. 1 and comprises three portions of a dye electrode 6, an electrolytic layer 4 and a counter electrode 7. Here, the dye electrode 6 indicates an electrode comprising an electrode substrate (e.g., electrically conducting glass) having formed thereon a metal oxide layer (e.g., titanium oxide, combined with a sensitizing dye, and the counter electrode 7 indicates an electrode comprising an electrode substrate (e.g., electrically conducting glass) having formed thereon a catalyst layer (e.g., platinum, graphite). The electrolytic layer 4 is a solution having dissolved therein an electrolyte and this is a portion sandwiched by the dye electrode and the counter electrode. The electrode substrate as used herein indicates an electrode substrate (e.g., glass, organic polymer) on which FTO, ITO or the like is coated and dried.

The mechanism of photoelectric conversion is described as follows.

First, the sensitizing dye absorbs light to generate an electron and a hole. The electron generated reaches through the metal oxide layer the electrode substrate and is taken outside. On the other hand, the hole generated is transferred through the electrolytic layer to the counter electrode and combines with an electron supplied through the electrode substrate.

As an index showing the characteristics of the dye sensitized solar cell, a photoelectric conversion efficiency represented by the following formula is known.

$$\eta(\%) = Jsc \times Voc \times FF / \text{incident light energy} \times 100$$

wherein $\eta$ is a photoelectric conversion efficiency, Jsc is a short-circuit current density [$mA/cm^2$], Voc is an open voltage [V], FF is a fill factor [–] and the incident light energy is an incident light energy [$mw/cm^2$] per unit area.

The photoelectric conversion efficiency $\eta$ depends on the performance of dye electrode. The factor of enhancing the performance of dye electrode includes increasing the surface area per unit of metal oxide to increase the amount of sensitizing dye supported and thereby increase the amount of electron generated, and increasing necking of metal oxide particles to attain smooth electron transfer. The "necking of particles" as used herein means a structure as shown in FIG. 2 and this is distinguished from the point contact structure of particles with each other.

These factors are described below by using titanium oxide as an example of the metal oxide.

As the method for increasing the surface area per unit of metal oxide, a method of using titanium oxide having a pore inner diameter of 3 to 10 nm is described (see, for example, Japanese Unexamined Patent Publication (Kokai) No. 2001-283942). According to this method, a sol prepared from titanium tetrachloride is heated and dried to obtain titanium oxide particles. However, the liquid-phase process titanium oxide obtained by the hydrolysis of titanium tetrachloride or the like undergoes a low heat history at the synthesis and the necking structure is disadvantageously less formed.

For increasing the necking of metal oxide particles, a method of forming a titanium oxide layer on a substrate such as electrically conducting glass and then treating it with titanium tetrachloride has been proposed (see, for example, C. J. Barbe et al., *J. Am. Ceram. Soc.*, 80, 3157 (1997)). Here, the titanium tetrachloride has an activity of reacting with a titanium oxide particle to generate new bonding and thereby neck the particles with each other. As such, the titanium tetrachloride treatment increases necking, however, this treatment has a problem in that crystallinity on the surface of titanium oxide particle decreases or lattice defects are generated. If the crystallinity is low or lattice defects are present, the conduction band energy level of titanium oxide decreases and when a solar cell is produced, the open voltage lowers and the photoelectric conversion efficiency decreases.

As another method for promoting the electron transfer, a method of mixing particle groups different in the particle size and thereby enhancing the filling density of particles is known. For example, 2 method of using semiconductor particle groups having a plurality of peaks in the particle size distribution has been proposed (see, for example, Japanese Unexamined Patent Publication (Kokai) No. 2001-357899). However, since a plurality of particle groups are merely mixed, only the point contact among particles is increased and the electron transfer efficiency is lower than in the case of necking structure.

The present invention has been made to solve the above-described problems and an object of the present invention is to provide a production method of a titanium oxide structure and a metal oxide suitable for solar cells, which ensures a large adsorbed amount of sensitizing dye, smooth electron transfer and high photoelectron conversion efficiency.

SUMMARY OF THE INVENTION

As a result of extensive investigations to solve those problems, the present inventors have found out a method capable of producing a metal oxide structure where the surface area per unit mass is large and particles are necked with each other. The above-described object can be attained by this finding.

More specifically, the object of the present invention can be attained by developing:

[1] a titanium oxide structure having an optical band gap (hereinafter referred to as "BG") of 2.7 to 3.1 eV as calculated from absorbance measured by an integrating sphere-type spectrophotometer and having a tap density of 0.15 to 0.45 $g/cm^3$;

[2] a metal oxide structure obtained by dry-mixing a plurality of metal oxide powder particles differing in the particle size, wherein assuming that an optical band gap (hereinafter referred to as "BG") of raw material metal oxide is BG0 and the BG of metal oxide after the dry mixing is BG1, the (BG0-BG1) is from 0.01 to 0.45 eV;

[3] a method for producing a metal oxide structure, comprising dry mixing a metal oxide, wherein assuming that an optical band gap (hereinafter referred to as "BG") of raw material metal oxide is BG0 and the BG of metal oxide after the dry mixing is BG1, the mixing is performed to give a (BG0-BG1) of 0.01 to 0.45 eV;

[4] the method for producing a metal oxide structure as described in [3] above, wherein the dry mixing is at least one method selected from a ball mill, a high-speed rotary grinder, a stirring mill and a jet grinder;

[5] the method for producing a metal oxide structure as described in [3] above, wherein the dry mixing is performed by a ball mill and assuming that the total mass of powder particles mixed is wp (g), the mass of medium is wm (g), the inner diameter of ball mill container is d (m), the rotation number is n (rpm) and the mixing time is t (minute), the energy constant k1 at the dry mixing represented by the following relationship:

$$k1 = wm/wp \times d \times n \times t$$

is from 3,000 to 250,000;

[6] the method for producing a metal oxide structure as described in [5] above, wherein the energy constant k1 is from 10,000 to 150,000;

[7] the method for producing a metal oxide structure as described in [5] above, wherein the energy constant k1 is from 10,000 to 50,000;

[8] the method for producing a metal oxide structure as described in any one of [3] to [7] above, wherein the raw material metal oxide comprises a metal oxide powder having an average primary particle size of 100 to 500 nm (hereinafter referred to as Particle Group A) and a metal oxide powder having an average primary particle size of 10 to 40 nm (hereinafter referred to as Particle Group B), the converted from the specific surface area determined by the BET method particle sizes being converted from the specific surface area determined by the BET method.

[9] the method for producing a metal oxide structure as described in [8] above, wherein Particle Group B is a mixture of a metal oxide powder having an average primary particle size of 20 to 40 nm (hereinafter referred to as Particle Group C) and a metal oxide powder having an average primary particle size of 10 to 20 nm (hereinafter referred to as Particle Group D), the particle sizes being converted from the specific surface area determined by the BET method;

[10] the method for producing a metal oxide structure as described in [8] or [9] above, wherein the average specific surface area of Particle Group B is from 60 to 110 m$^2$/g;

[11] the method for producing a metal oxide structure as described in any one of [8] to [10] above, wherein at least one of Particle Groups A to D is a metal oxide synthesized by a gas phase process;

[12] the method for producing a metal oxide structure as described in any one of [3] to [11] above, wherein the tap density is from 0.15 to 1.0 g/cm$^3$;

[13] the method for producing a metal oxide structure as described in any one of [3] to [12] above, wherein the metal oxide is titanium oxide;

[14] the method for producing a metal oxide structure as described in any one of [3] to [12] above, wherein the metal oxide is a mixture of titanium oxide and at least one metal oxide selected from zinc oxide, niobium oxide, tantalum oxide, zirconium oxide, tin oxide and tungsten oxide;

[15] the method for producing a metal oxide structure as described in [14] above, wherein the content of titanium oxide contained in the metal oxide mixture is 10 mass % or more;

[16] a method for producing a metal oxide dispersion, comprising adding a dispersion medium to the titanium oxide structure described in [1] above, the metal oxide structure described in [2] above or a metal oxide structure obtained by the production method described in any one of [3] to [15] above, and wet-mixing these by a ball mill, wherein assuming that the total mass of powder particles mixed is wp (g), the mass of medium is wm (g), the inner diameter of ball mill container is d (m), the rotation number is n (rpm) and the mixing time is t (minute), the energy constant k2 at the wet mixing represented by the following relationship:

$$k2 = wm/wp \times d \times n \times t$$

and the energy constant k1 at the dry mixing satisfy the following relationship:

$$k2 \geq k1;$$

[17] the method for producing a metal oxide dispersion as described in [16] above, wherein the energy constant k2 at the wet mixing and the energy constant k1 at the dry mixing satisfy the following relationship:

$$8.0 \times k1 \geq k2 \geq 1.5 \times k1;$$

[18] the method for producing a metal oxide dispersion as described in [16] above, wherein the energy constant k2 at the wet mixing and the energy constant k1 at the dry mixing satisfy the following relationship:

$$5.0 \times k1 \geq k2 \geq 2.5 \times k1;$$

[19] a titanium oxide-containing metal oxide dispersion obtained by the production method described in any one of [16] to [18] above;

[20] a composition comprising the titanium oxide structure described in [1] above, the metal oxide structure described in [2] above, a metal oxide structure obtained by the production method described in any one of [3] to [15] above, or the titanium oxide-containing metal oxide dispersing element described in [19] above;

[21] a thin film comprising the titanium oxide structure described in [1] above, the metal oxide structure described in [2] above, a metal oxide structure obtained by the production method described in any one of [3] to [15] above, or the titanium oxide-containing metal oxide dispersion described in [19] above;

[22] the metal oxide structure-containing thin film as described in [21] above, wherein the film has a thickness of from 1 to 40 μm;

[23] a method for producing a dye sensitized solar cell, comprising including the metal oxide structure obtained by the production method described in any one of [3] to [15] above as a dye sensitized electrode;

[24] a method for producing a dye sensitized solar cell, comprising including the metal oxide structure obtained by the production method described in any one of [3] to [15] above and the metal oxide dispersion described in any one of [17] to [19] above as a dye sensitized electrode;

[25] a dye sensitized solar cell produced by the production method described in [23] or [24] above;

[26] a dye sensitized solar cell equipped with a dye electrode comprising, as a constituent member, the metal oxide structure-containing thin film described in [22] above;

[27] a dye sensitized solar cell, wherein an optical band gap (hereinafter referred to as "BG") of titanium oxide after removing the dye from the dye electrode is 2.7 to 3.1 eV;

[28] an article having a power-generating function, equipped with the dye sensitized solar cell described in any one of [25] to [27] above;

[29] an article having a light-emitting function, equipped with the dye sensitized solar cell described in any one of [25] to [27] above;

[30] an article having a heat-generating function, equipped with the dye sensitized solar cell described in any one of [25] to [27] above;

[31] an article having a sound-generating function, equipped with the dye sensitized solar cell described in any one of [25] to [27] above; and

[32] an article having a moving function, equipped with the dye sensitized solar cell described in any one of [25] to [27] above.

PREFERRED MODE FOR CARRYING OUT THE INVENTION

The metal oxide structure of the present invention is a structure containing metal oxide particle microstructure. The metal oxide structure of the present invention is a structure characterized by containing necking structure (partial area bonding or contact structure) of particles.

The metal oxide structure of the present invention is obtained by dry-mixing a metal oxide powder having an average primary particle size of 100 to 500 nm (hereinafter referred to as Particle Group A) and a metal oxide powder having an average primary particle size of 10 to 40 nm (hereinafter referred to as Particle Group B), the particle sizes being converted from the specific surface area determined by the BET method. The dry mixing as used herein means a method of mixing the powder particles without using a dispersion medium such as water or an organic solvent. In the wet mixing using a dispersion medium, the energy generated due to collision, friction or the like diffuses not only into the particles but also into the dispersion medium and therefore, a mechanochemical reaction is difficult to occur. The important point is to allow a mechanochemical reaction to proceed by dry mixing and attain necking of particles with each other.

Figure 1:
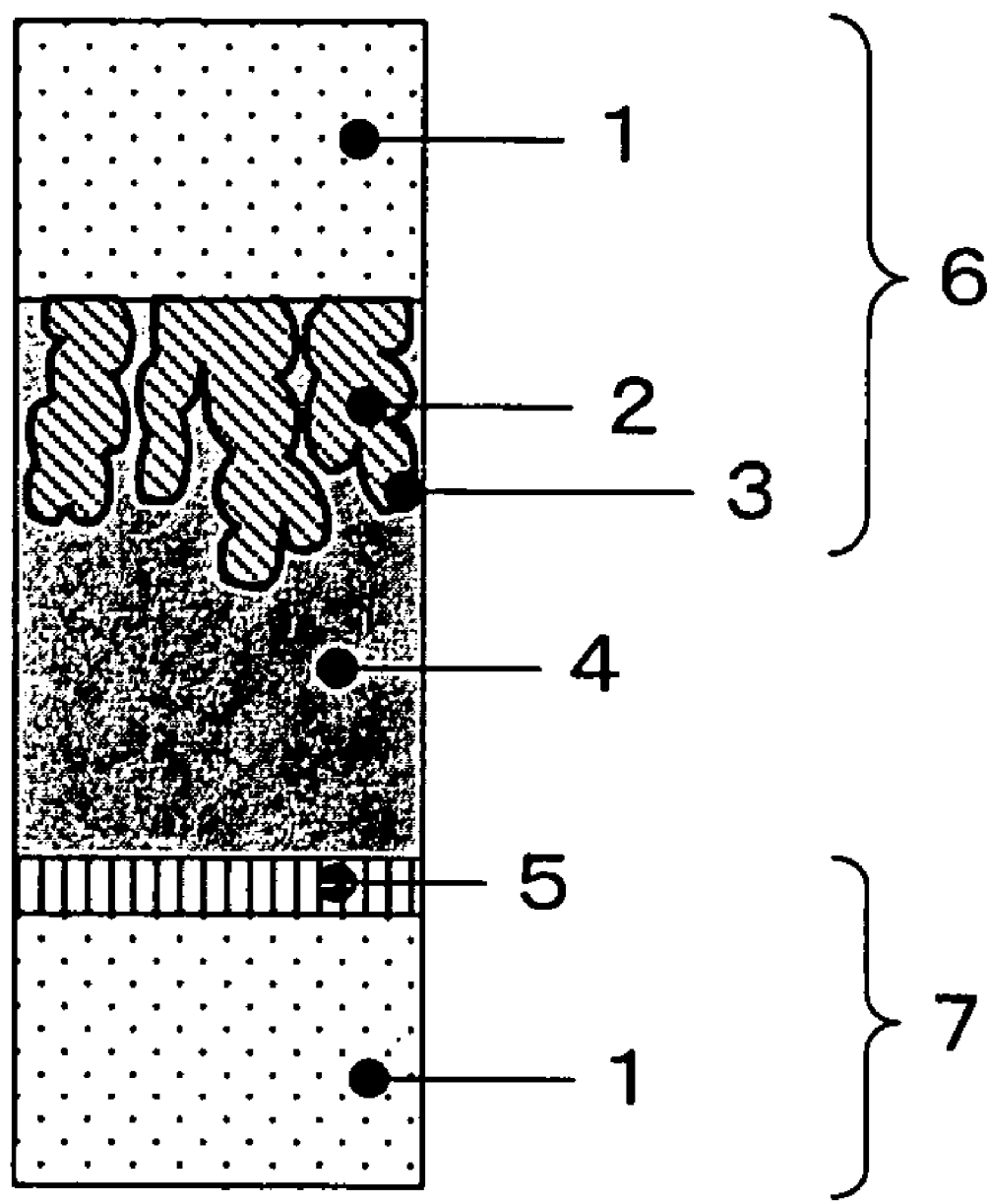
FIG. 1 is a cross section showing an outline of the constitution of a dye sensitized solar cell.
Figure 2:
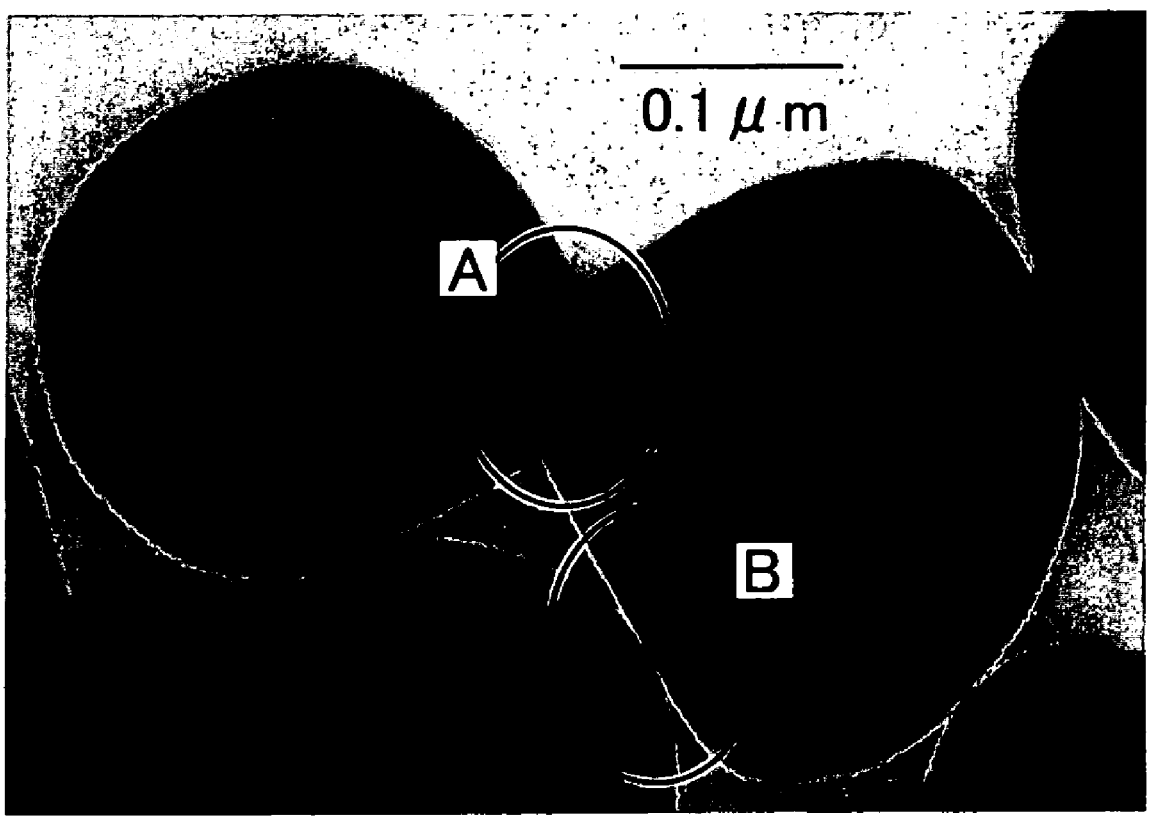
FIG. 2 is an electron micrograph showing the necking state of titanium oxide particles.

In the state where Particle Group A and Particle Group B are merely mixed, the particles make only point contact with each other and therefore, the electron transfer efficiency is low as compared with the particle structure having a necking structure (partial plane contact structure) as shown in FIG. 2. For attaining smooth electron transfer, it is important to have a necking structure of particles with each other.

A so-called liquid-phase process metal oxide obtained by the wet hydrolysis of a halogenated metal or the like undergoes a low heat history at the synthesis. In this state, the necking structure is less formed and therefore, the electron transfer efficiency is low. On the other hand, a metal oxide particle group obtained by a so-called vapor-phase process of reacting a halogenated metal or the like with an oxidizing gas such as oxygen at a high temperature is subject to a high heat history at the synthesis and therefore, this metal oxide particle group has a high crystallinity and at the same time, has a necking bond, as a result, a structure facilitating in the electron transfer and advantageous to the diffusion of an electrolytic solution is obtained. This production method by a vapor-phase process is not particularly limited but in the case of titanium oxide, its synthesis can be performed, for example, by the method of Patent Documents 3, 4 or 5.

In the production method of the present invention, at least one particle group of the metal oxides constituting the metal oxide structure is preferably obtained by a vapor-phase process. As described above, in the case of a metal oxide obtained by a vapor-phase process, the particles themselves form a necking structure with each other to some extent and in such a structure, the electron transfer is somewhat facilitated. The electron transfer may be more promoted by further increasing the number of particles forming a necking structure. In this meaning, the employment of a mechanochemical reaction by dry mixing is more effective.

According to the vapor-phase process, a powder having a relatively narrow primary particle size distribution can be obtained as compared with other production methods and therefore, when this powder is used as Particle Group A or B, a primary particle size distribution preferred as the metal oxide structure of the present invention is easily obtained.

In the production method of the present invention, Particle Group A constituting the metal oxide structure mainly acts on light intruded into a solar cell to scatter the light inside the cell and thereby increase the light absorption efficiency. In a dye sensitized solar cell, light over the region from ultraviolet to near infrared is absorbed to generate an electron and therefore, when light over the region from ultraviolet to near infrared is scattered inside the solar cell, the probability of light absorption by a sensitizing dye or the like increases. In general, it is known that maximum light scattering is obtained when the particle size is about a half of the light wavelength, and as the particle size more deviates therefrom, the light scattering is also lessened (see, Non-Patent Document 3). In order to scatter light over the region from ultraviolet to near infrared, the average primary particle size is preferably from 100 to 500 nm. The particle size can also be selected according to the wavelength of light intended to scatter.

Particle Group B has a role of supporting a sensitizing dye and transmitting an electron generated by the sensitizing dye. The sensitizing dye is supported on the metal oxide by chemical bonding with the surface hydroxyl group or metal atom (hereinafter referred to as a "dye bonding portion") of metal oxide and transfers an electron to the metal oxide through the bond. Therefore, as the amount of sensitizing dye bonded to the metal oxide increases, the number of electrons transferred increases. The metal oxide particle, for example, titanium oxide particle is known to have from 9 to 14 surface hydroxyl groups/$nm^2$ on the surface thereof (see, Manabu KIYONO, *Sanka Titan (Titanium Oxide)*, supra, pp. 54-55) and as the titanium oxide has a larger specific surface area, the dye bonding portion more increases. The specific surface area of Particle Group B suitable for solar cells is from about 40 $m^2$/g to about 150 $m^2$/g, preferably from about 60 $m^2$/g to about 110 $m^2$/g.

In the case of titanium oxide, when the specific surface area is converted into an average primary particle size, this is from about 10 nm to about 40 nm, preferably from about 13 nm to about 25 nm. If the particle group has an average primary particle size of less than about 10 nm, the crystallinity is generally low and smooth electron transfer is not attained, therefore, this particle group is not suitable for use in a solar cell. This low crystallinity is attributable to the heat history suppressed low at the synthesis so as to prevent the growth of particle. If the particle group has an average primary particle size exceeding about 40 nm, the specific surface area is small and the amount of dye adsorbed is insufficient. The blending ratio of Particle Group A and Particle Group B is A/B=from 5/95 to 30/70 (by mass), preferably A/B=from 10/90 to 20/80 (by mass).

In order to attain smooth electron transfer, the particles preferably form a necking structure with each other and at the same time, are densely filled. For elevating the filling density, the method of combining particle groups differing in the average particle size is simple and easy. Particle Group B classified into an ultrafine particle may be used as it is (single particle group) but the filling density is low in many cases, therefore, particle groups differing in the particle size are preferably combined to elevate the filling density, whereby good results can be obtained. The average primary particle size of each particle group used as the base for the combination is preferably selected from the particle size range suitable for Particle Group B. A combination of Particle Group C having an average primary particle size Cf 20 to 40 nm and Particle Group D having an average primary particle size of 10 to 20 nm is preferred. The blending ratio of Particle Group C and Particle Group D is C/D=from 10/90 to 80/20 (by mass), preferably C/D=from 15/85 to 75/25 (by mass).

The chemical compositions of Particle Groups A, B and C may be the same or different from each other.

One of indices showing the filling state of particles is the tap density. As the filling density elevates, the value increases. The tap density is measured by the following method.

A powder tester such as Type PT-D manufactured by Hosokawa Micron Corporation is used. A sample is filled in a 100 cm³-volume cup with an auxiliary cup and subjected to tapping 100 times by the powder tester. After the auxiliary cup is removed, the sample is exactly filled to 100 cm³ and the mass (g) of the sample is measured. The tap density is obtained by dividing the mass (g) of the powder particles by 100.

In the production method of the present invention, the metal oxide structure obtained preferably has a tap density of 0.15 to 1.0 g/cm³. If the tap density is less than 0.15 g/cm³, this reveals insufficient filling density, whereas if the tap density exceeds 1.0 g/cm³, the metal oxide structure is difficultly dispersed when used as a dispersion. The metal oxide structure dispersion in a poor dispersed state is reduced in the void portion of the metal oxide structure and when a dye sensitized solar cell is produced, the electrolyte scarcely diffuses into the metal oxide layer to cause shortage of electrolyte inside the metal oxide layer and the shortage of electrolyte gives rise to failure in the smooth transfer of electric charge.

In the dry mixing, for example, a ball mill, a high-speed rotary grinder, a stirring mill or a jet grinder is used. As long as an energy of causing a mechanochemical reaction in the particle groups is imparted, any mill or grinder may be used but the equipment used is preferably formed of a material difficult to contaminate. In the following, an example of using a rolling ball mill among ball mills is described.

The rolling ball mill is a most general-purpose mixing and grinding method and this method utilizes the collision, frictional action or the like between the powder particles and the mediums in the container, which occurs resulting from rolling of a cylindrical container. In this case, the energy constant k which has been proposed as an index for the unified evaluation of the mixing and grinding effect by a rolling ball mill (see, Non-Patent document 4) is represented by the following formula:

$$k = wm/wp \times d \times n \times t$$

wherein wp represents a total mass (g) of powder particles mixed, wm represents a mass (g) of medium, d represents an inner diameter (m) of ball mill container, n represents a rotation number (rpm) and t represents a mixing time (minutes).

As the energy constant elevates, the collision or friction energy imposed on the powder particle increases and the mechanochemical reaction more easily proceeds, as a result, aggregation takes place more vigorously.

In the method for producing a metal oxide structure of the present invention, assuming that the energy constant at dry mixing is k, k1 is preferably from 3,000 to 250,000. If the energy constant k1 is less than the lower limit, the mechanochemical reaction proceeds insufficiently and the particles are less bonded with each other, whereas if the energy constant k1 exceeds the upper limit, the mechanochemical reaction proceeds but when the metal oxide structure is used in a dispersion it is difficult to be dispersed and the void portion of the obtained metal oxide structure is reduced. The reduction in the void portion adversely affects the diffusion of electrolyte when a dye sensitized solar cell is produced, giving rise to decrease in the performance of the solar cell. Furthermore, the excessive mechanochemical reaction extremely lowers the conduction band energy level of metal oxide structure and when a solar cell is produced, the open voltage decreases to reduce the photoelectric conversion efficiency.

In other mixing methods, the conditions are also preferably adjusted to give an energy sufficiently high to cause a mechanochemical reaction in the particle groups mixed. For example, the mechanochemical reaction may be allowed to proceed by adjusting the rotation number, residence time or the like in the case of a high-speed rotary grinder; by adjusting the stirring rate, mass of medium, stirring time or the like in the case of a stirring mill; and by adjusting the pressure of carrier gas, residence time or the like in the case of a jet grinder.

For detecting the mechanochemical reaction, a method of measuring the change of optical band gap (hereinafter referred to as BG) between before and after dry mixing is known.

The change in BG of metal oxide is considered to occur because the molecular orbital in the vicinity of metal oxide particle surface is changed by the mechanochemical reaction. The particles differing in the primary particle size differ also in the lattice state on the particle surface and therefore, difference is present in the BG of these particles. When particles differing in BG are combined with each other by the mechanochemical reaction, a new molecular orbital is generated to give a value different from BG before the mechanochemical reaction. Also, a phenomenon that crystallinity on the particle surface decreases and BG changes can occur. Therefore, by measuring the difference of BG between before and after dry mixing (hereinafter simply referred to as ΔBG), the bonding or surface state of a particle of Particle Group A and a particle of Particle Group B can be specified. The method for measuring BG and ΔBG is described below.

Figure 3:
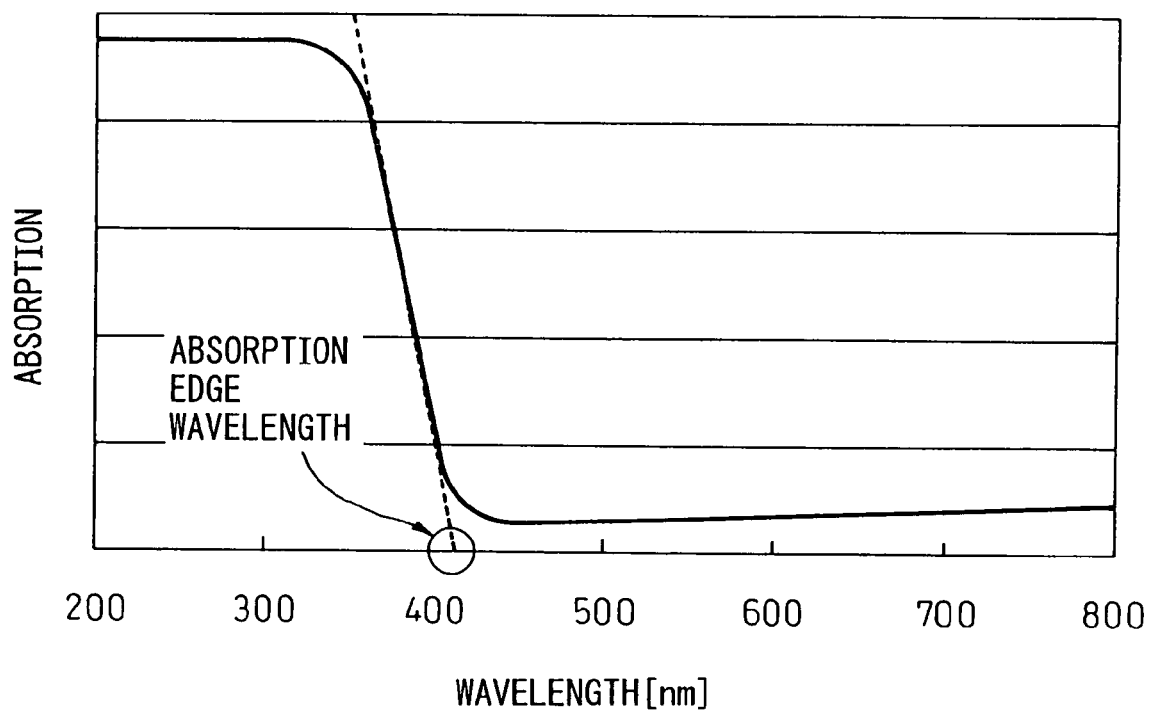
FIG. 3 is an absorbance pattern for determining the absorption edge wavelength.

The relationship between the wavelength and the absorbance is measured, for example, by using an integrating sphere-type spectrophotometer Model UV-2400 or Model ISR-240A manufactured by Shimadzu Corporation. A tangent line is drawn with respect to inflection point of the obtained absorbance pattern (see, FIG. 3) and the point (absorption edge wavelength) where the tangent line and the wavelength axis are crossed is read. FIG. 3 shows one example of the relationship between the absorbance pattern and the absorption edge wavelength.

BG is represented by the following formula:

$$E=1240/\lambda$$

(wherein E represents BG [eV] and λ represents the absorption edge wavelength [nm]) and therefore, assuming that BG and absorption edge wavelength before dry mixing are BG0 [eV] and λ0 [nm], respectively, and BG and absorption edge wavelength after dry mixing are BG1 [eV] and λ1 [nm], respectively, the BG values before and after dry mixing are:

$$BG0=1240/\lambda 0, \text{ and}$$

$$BG1=1240/\lambda 1$$

respectively. Accordingly, ΔBG [eV] between before and after dry mixing is represented by the following formula:

$$\Delta BG=BG0-BG1=(1240/\lambda 0)-(1240/\lambda 1)$$

In general, the anatase-type titanium oxide is known to have BG of 3.2 eV (see, Non-Patent Document 5). However, the BG is liable to decrease by the mechanochemical reaction.

Other metal oxides or a mixture thereof show the same BG decreasing tendency.

In the production method of the present invention, ΔBG between before and after dry mixing of the obtained metal oxide structure is preferably from 0.01 to 0.45 eV. If ΔBG is less than 0.01 eV, this reveals less bonding of particles with each other and the electron transfer among particles is difficult to occurs. If ΔBG exceeds 0.45 eV, the crystallinity on the particle surface greatly decreases and this causes not only reduction in the electron transfer speed but also serious decrease in the conduction band energy level of metal oxide structure, as a result, when a solar cell is produced, the open voltage lowers to decrease the photoelectric conversion efficiency.

The titanium oxide structure of the present invention is characterized in that BG1 is from 2.7 to 3.1 eV.

The metal oxide structure obtained by the production method of the present invention can also be used as a dispersion of titanium oxide structure by dispersing it in a solvent capable of dispersing the metal oxide, such as water, ethanol, acetone, acetonitrile, ethylene carbonate and propylene, or in a mixed solvent thereof. To the dispersing element, a binder may be added, such as one or a mixture of polymer compounds selected from polyethylene glycol, polyvinyl alcohol, poly-N-vinyl acetamide, polyacrylate, an N-vinylacetamide-sodium acrylate copolymer, an N-vinylacetamide-acrylamide copolymer, polyacrylamide, an acrylamide-sodium acrylate copolymer, poly-N-vinylformamide, polytetrafluoroethylene, a tetrafluoroethylene-polypropylene fluoride copolymer, a tetrafluoroethylene-polyfluoroalkyl vinyl ether copolymer, polyvinyl fluoride, polyvinylidene fluoride, a styrene-butadiene copolymer, polyvinylpyridine, a vinylpyridine-methyl methacrylate copolymer and polyvinylpyrrolidone. The binder as used herein means a material having an activity of preventing cracking from occurring at the time of coating the dispersing element on a substrate or the like and forming a film, or preventing stripping from the substrate. Among these binders, preferred are polyethylene glycol, polyvinyl alcohol, poly-N-vinylacetamide, polyacrylamide, polyacrylate, an N-vinylacetamide-sodium acrylate copolymer, an acrylamide-sodium acrylate copolymer and polytetrafluoroethylene. In the case of using a polyacrylate, preferred examples of the salt include alkali metals and alkaline earth metals. Among these salts, sodium, lithium, potassium, ammonium and magnesium are more preferred.

As the molecular weight of the binder is higher, the performance is more enhanced. Specifically, the average molecular weight is preferably 500 or more, more preferably 10,000 or more.

In the method for producing a metal oxide structure of the present invention, assuming that the energy constant at the time of adding a dispersion medium to the obtained metal oxide structure and wet-mixing the structure by a ball mill is k2, the relationship with the energy constant k1 at dry mixing is preferably $k2 \geq k1$, more preferably $8.0 \times k1 \geq k2 \geq 1.5 \times k1$, and most preferably $5.0 \times k1 \geq k2 \geq 2.5 \times k1$.

In the metal oxide structure produced by dry mixing, the metal oxide structure are also aggregated with each other and the void portion is reduced. As long as the tap density of the metal oxide structure obtained by dry mixing is 0.45 g/cm³ or less, when a solar cell is produced, the diffusibility of electrolytic solution is not greatly affected. However, if the tap density exceeds 0.45 g/cm³, the diffusibility of electrolytic solution sometimes decreases to cause reduction in the performance of the solar cell. In order to avoid the reduction in the performance of the solar cell, the aggregate of metal oxide structure with each other is preferably dispersed by wet mixing. The wet mixing method is not particularly limited insofar as it mixes the metal oxide with a dispersion medium and disaggregates the aggregate of metal oxide structure. For example, a ball mill, a high-speed rotary grinder or a stirring mill may be used. In the case of wet mixing by a ball mill, as the energy constant k2 increases, the dispersibility is enhanced. However, experimentally, it is effective to adjust the k2 to 1.0 times or more the energy constant k1 at dry mixing. Also, although the dispersing effect is higher as the k2 is larger, the upper limit of k2 is determined from the economical viewpoint.

If the tap density of the metal oxide structure after dry mixing exceeds 1.0 g/cm³, the metal oxide cannot be dispersed unless the k2 at wet mixing is set to a large value, and this is economically disadvantageous.

The metal oxide which can be used in the production method of the present invention is titanium oxide or a mixture of titanium oxide and at least one metal oxide selected from zinc oxide, niobium oxide, tantalum oxide, zirconium oxide, tin oxide and tungsten oxide.

The metal oxide structure of the present invention or the above-described metal oxide structure dispersion may also be used as an electrode for dye solar cells by coating it on an electrode plate such as electrically conducting glass substrate and forming a thin film.

The electrode base material constituting the electrode substrate of a dye sensitized solar cell containing the metal oxide of the present invention may be glass or an organic polymer.

Specific examples of the organic polymer include polyolefins such as polyethylene, polypropylene and polystyrene, polyamides such as nylon 6, nylon 66 and aramid, polyesters such as polyethylene terephthalate, polyethylene naphthalate and unsaturated polyester, polyvinyl chloride, polyvinylidene chloride, polyethylene oxide, polyethylene glycol, silicon resin, polyvinyl alcohol, vinyl acetal resin, polyacetate, ABS resin, epoxy resin, vinyl acetate resin, cellulose and cellulose derivatives (e.g., rayon), urethane resin, polyurethane resin, polycarbonate resin, urea resin, fluororesin, polyvinylidene fluoride, phenol resin, celluloid, chitin, starch sheet, acrylic resin, melamine resin and alkyd resin. Among these, polyethylene terephthalate and polyethylene naphthalate are preferred.

The transparent electrode substrate can be obtained by forming an electrically conducting oxide thin film such as tin oxide, fluorine-doped tin oxide, indium oxide, zinc oxide, antimony oxide or a mixture thereof, on the above-described electrode base material. Among these, fluorine-doped tin oxide (FTO), indium tin oxide (ITO) and a mixture thereof are preferred as the electrically conducting oxide thin film. Examples of the method for forming the thin film include a method of spraying an ethanol solution of indium chloride and tin chloride onto the heated electrode base material, a method of sputtering the objective electrically conducting oxide target in an Ar gas atmosphere, a method of vacuum-depositing the objective electrically conducting oxide in an oxygen atmosphere, and an ion-plating method. As a post-treatment, heating the electrode substrate in an oxidizing atmosphere at a temperature selected according to the electrode base material and thereby enhancing the crystallinity is also effective. Depending on the thin-film formation method, the surface resistance of the electrode substrate varies, but in any method, the thin film is preferably formed to give a surface resistivity of 20Ω/□ or less.

The method for forming the metal oxide structure into a thin film on the electrode substrate is divided into a step of coating a metal oxide structure dispersion on the electrode substrate and a drying step subsequent thereto. Examples of the method for coating the dispersion at the coating step include a squeegee method, a doctor blade method, a screen printing method, a spray method and a spin coating method. Other methods may also be used without any particular limitation as long as the film thickness can be adjusted.

Examples of the drying method at the step of drying the dispersion include a method of blowing a hot air by a drier or the like to the coated film, a method of irradiating an infrared ray, a method of elevating the temperature of electrode, and a method of blowing a dry air to the coated film. Other than these, a method of evaporating the solvent from the metal oxide structure dispersion solution coated on the electrode substrate may also be used without any particular limitation insofar as the drying temperature is a temperature of not causing deformation or denaturing of the electrode substrate.

In the thus-obtained thin film of metal oxide structure, fine cracks or the like may be present and when a solar cell is produced, the electrode substrate may come into direct contact with the electrolytic solution to cause a reverse electron transfer (leakage current). For preventing cracks, it is preferred to previously form a dense metal oxide layer on the electrode substrate in advance of coating the metal oxide structure dispersing element (hereinafter, the previously formed dense metal oxide layer is called an undercoat layer and the material for forming the undercoat layer is called an undercoating agent). The undercoating agent is preferably a particle having a primary particle size of 20 nm or less, more preferably a metal oxide having good dispersibility, and most preferably ultrafine particulate titanium oxide.

The undercoating agent may be bound to the electrode substrate, for example, by a method of coating the undercoating agent and thereafter baking it at 300° C. or more. However, if baked at this temperature, deformation or denaturing may occur depending on the construction material of the electrode base material. In such a case, it is effective to add a binding component to the undercoating agent. The binding component is a substance having a function of binding the metal oxide structure to the electrode substrate. The binding compound may be at least one compound selected from silica compounds, zirconia compounds, alumina compounds and titanium compounds which are soluble in water or an organic solvent. Examples thereof include oxychloride, hydroxychloride, nitrate, ammonium carbonate and propionate of various metals. These binding components can bind the undercoating agent to the electrode substrate even by the drying at an ordinary temperature or a relatively low temperature.

The amount of the binding component added must be controlled not to inhibit the electron transfer and the amount added is preferably, in terms of the weight ratio of metal contained in the binding component as converted into a metal oxide, from 3 to 200 parts by weight per 100 parts by weight of the metal oxide structure.

In one example of the method for obtaining the thin film, an ultrafine particulate titanium oxide sol having a binder component is coated on an electrically conducting substrate using polyethylene terephthalate as the electrode base material and dried at 120° C. and then the metal oxide dispersing element obtained by the production method of the present invention is coated thereon by spraying and heated in a hot air drier at 120° C. for 20 minutes.

Also, a photocatalytic film or UV-absorbing film having high transparency may be provided on outer side surfaces (two surfaces) of the electrode base material.

By providing a photocatalytic film, the electrode surface can be kept clean and thereby, the incident light into the cell can be prevented from decreasing in aging. The photocatalyst particle constituting the photocatalytic film is not particularly limited but ultrafine particulate transition metal oxides are preferred and among these, ultrafine particulate titanium oxide and ultrafine particulate zinc oxide are more preferred.

The photocatalytic film is described below.

(Constitution 1)

At least a photocatalytic thin film having a photocatalytic activity and at the same time, giving a light linear transmittance of 50% or more, preferably 80% or more, for light at a wavelength 550 nm is formed on the outer surfaces of the electrode base material.

(Constitution 2)

In Constitution 1, the thickness of the photocatalytic thin film is from about 0.1 to about 5 μm.

In Constitution 1 or 2, a precoat thin film having light transmitting property may be provided between the outer surface of the electrode base material and the photocatalytic thin film. The thickness of the precoat thin film is preferably from about 0.02 to about 0.2 μm. Furthermore, the precoat thin film is preferably formed of a material mainly comprising $SiO_2$ or a precursor thereof.

As for the production method of the photocatalytic film, a photocatalytic thin film can be formed on the outer surfaces of the electrode base material by pyrosol process, dipping, printing or CVD. The photocatalytic film may be formed after a cell is assembled or an electrode base material having previously formed thereon the photocatalytic film may be produced.

By forming at least a photocatalytic thin film having a photocatalytic activity and at the same time, giving a light linear transmittance of 50% or more, preferably 80% or more, for light at the wavelength of 550 nm, the outer side surfaces of the electrode can be kept clean over a long period of time, as a result, the amount of light entering into the cell can be kept large and the photoelectric conversion efficiency can be maintained. Furthermore, when the photocatalyst particle is ultrafine particulate titanium oxide or ultrafine particulate zinc oxide, the ultraviolet light is satisfactorily cut by the photocatalytic film and therefore, the organic materials (e.g., dye, electrolyte component) present in the cell can be prevented from aging deterioration due to ultraviolet light.

As the material for forming the titanium oxide thin film, the following ultrafine particulate titanium oxide sol can be used. Examples of the method for producing a ultrafine particulate titanium oxide sol include the method described in Japanese Unexamined Patent Publication (Kokai) No. 11-43327. For example, the ultrafine particulate titanium oxide sol can be obtained by hydrolyzing titanium tetrachloride.

In this case, if the titanium tetrachloride concentration in an aqueous titanium tetrachloride solution hydrolyzed is too low, the productivity is low and at the time of forming a thin film from the produced water dispersion titanium oxide sol, the efficiency disadvantageously decreases. On the other hand, if the concentration is excessively high, the reaction vigorously proceeds and the obtained titanium oxide particle is not preferred as a transparent thin film-forming material because this is not a fine particle and shows poor dispersibility. Therefore, the method of producing a sol having a high titanium oxide concentration by hydrolysis and diluting it with a large amount of water to adjust the titanium oxide concentration to 0.05 to 10 mol/liter is not preferred. The titanium oxide concentration is preferably adjusted to 0.05 to 10 mol/liter at the production of sol and this may be attained by setting the titanium tetrachloride concentration in an aqueous titanium tetrachloride solution hydrolyzed to a value not so different from the concentration of titanium oxide produced, namely, approximately from 0.05 to 10 mol/liter. If desired, the concentration may be adjusted to 0.05 to 10 mol/liter by adding a slight amount of water or concentrating the solution in a later step.

The temperature at the hydrolysis is preferably from 50° C. to the boiling point of the aqueous titanium tetrachloride solution. If the temperature is less than 50° C., the hydrolysis reaction takes a long time and this is not preferred. The hydrolysis is performed by elevating the temperature to a predetermined temperature and holding it for approximately from 10 minutes to 12 hours. This holding time may be shorter as the hydrolysis temperature is higher. The hydrolysis of the aqueous titanium tetrachloride solution may be performed by a method of heating a mixed solution of titanium tetrachloride and water in a reaction tank at a predetermined temperature or by a method of previously heating water in a reaction tank, adding thereto titanium tetrachloride and elevating the temperature to a predetermined temperature. By this hydrolysis, brookite titanium oxide where anatase type and/or brookite type are mixed is generally obtained.

In the case of increasing the brookite titanium oxide content, a method of previously heating water in a reaction tank at 75 to 100° C., adding thereto titanium tetrachloride and performing the hydrolysis in the temperature range from 75° C. to the boiling point of the solution is suitably used. According to this method, brookite titanium oxide can occupy 70 wt % or more of the entire titanium oxide produced.

The temperature elevating rate of the aqueous titanium tetrachloride solution at the hydrolysis is preferably higher, because finer particles can be obtained. The temperature elevating rate is preferably 0.2° C./min or more, more preferably 0.5° C./min or more. With this temperature elevating rate, the titanium oxide particles in the sol can have an average particle size of 0.5 μm or less, preferably from 0.01 to 0.1 μm and furthermore, a particle having high crystallinity can be obtained.

The production method of the water dispersion titanium oxide sol for use in the present invention is not limited to the batch system but a continuous system using a continuous tank for the reaction tank may also be employed, where while continuously charging titanium tetrachloride and water, the reaction solution is taken out from the side opposite the charging port and subsequently subjected to a dechlorination treatment. The produced sol is adjusted to a chloride ion concentration of 50 to 10,000 ppm by subjecting it to dechlorination, addition of water within the range of not causing problems, dehydration or the like. The dechlorination treatment may be performed by a generally known method and, for example, electrodialysis, ion exchange resin or electrolysis may be used. The degree of dechlorination may be known by using the pH of sol as a measure. When the chlorine ion is from 50 to 10,000 ppm, the pH is from about 5 to 0.5, and when the chlorine ion is in its preferred range of 100 to 4,000 ppm, the pH is from about 4 to 1. An organic solvent may also be added to the water dispersion sol of the present invention to disperse titanium oxide particles in the mixture of water and organic solvent. In the case of forming a titanium oxide thin film from this water dispersion titanium oxide sol, the sol produced by the hydrolysis reaction is preferably used as it is and a method of producing titanium oxide powder from the sol, dispersing the powder in water and using the resulting sol is not preferred.

Examples of the method for obtaining the thin film include a method where an ultrafine particulate titanium oxide sol having a binder component is coated on an electrically conducting substrate using polyethylene terephthalate as the electrode base material and dried at 120° C. and then the metal oxide dispersing element obtained by the production method of the present invention is coated thereon by spraying and heated in a hot air drier at 120° C. for 20 minutes.

As the ultrafine particulate titanium oxide sol, a sol obtained by hydrolyzing titanium tetrachloride (see, for example, Kokai No. 11-43327) can be used similarly to the photocatalytic material in the outer surface side of the electrode base material.

Furthermore, solidification or quasi-solidification of electrolyte is effective for preventing leakage of electrolyte to the outside of a cell or elution of electrode substance or for avoiding problems such as elevation of internal impedance or occurrence of internal short-circuit due to deviation or exhaustion of electrolytic solution in a cell. To speak specifically, a thermopolymerizable composition comprising a combination of a thermopolymerizable compound containing a (meth)acrylate having an oxyalkylene, fluorocarbon, oxyfluorocarbon and/or carbonate group-containing moiety in the molecule with a polymerization initiator which is an organic peroxide not having a benzene ring, is heat-cured and the obtained solid electrolyte can be used as the electrolyte.

To speak more specifically, the thermopolymerizable compound which becomes a polymer having a crosslinked and/or side chain form structure after polymerization preferably contains a compound having a polymerizable functional group represented by the following formula (1) and/or formula (2):

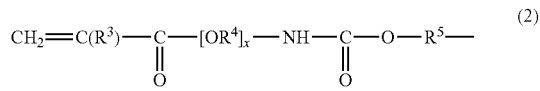

wherein $R^1$ and $R^3$ each represents hydrogen or an alkyl group, $R^2$ and $R^5$ each represents a divalent group containing an oxyalkylene, fluorocarbon, oxyfluorocarbon and/or carbonate group, R⁴ represents a divalent group having a carbon number of 10 or less, $R^2$, $R^4$ and $R^5$ each may contain a heteroatom and may have a linear, branched or cyclic structure, x represents 0 or an integer of 1 to 10, provided that when a plurality of polymerizable functional groups represented by formula (1) or (2) are contained within the same molecule, $R^1$, $R^2$, $R^3$, $R^4$, $R^5$ and x each may be the same or different among respective polymerizable functional groups.

The polymerization initiator which is an organic peroxide not having a benzene ring is preferably an organic peroxide represented by the following formula (3):

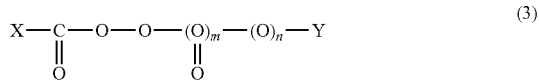

wherein x represents an alkyl or alkoxy group which may have a substituent, Y represents an alkyl group which may have a substituent, X and Y each may have a linear, branched or cyclic structure, and m and n each is 0 or 1, provided that the combination of (m,n)=(0,1) is excluded.

In the case where the construction material of the electrode base material is glass, the drying can be performed under a relatively high temperature condition by using an electric furnace or the like.

The thin film of the metal oxide structure preferably has a thickness of about 1 to about 40 μm. If the thickness is less than about 1 μm, scattering or absorption of light in the thin film is insufficient and the photoelectric conversion efficiency decreases, whereas if the thickness exceeds about 40 μm, the diffusion resistance of electrolyte increases or the electron transfer distance is prolonged, therefore, the performance is not always enhanced and moreover, the film-forming operation becomes cumbersome.

The method for producing a dye sensitized solar cell of the present invention is characterized by comprising a step of preparing Particle Groups A, B and C, a step of mixing these particles by dry mixing for specifying the BG, and a step of mixing the dry-mixed particles by wet mixing.

In the thus-obtained dye sensitized solar cell, the BG of metal oxide electrode can be confirmed as follows.

The metal oxide electrode of the dye sensitized solar cell is dipped in 0.1 mol/L of an aqueous sodium hydroxide solution or the like to thoroughly elute the dye from the metal oxide. The metal oxide electrode from which the dye is eluted is washed with water and dried at 120° C. for 2 hours to obtain a sample electrode. The BG of the metal oxide supported on this sample electrode can be determined by the above-described BG measuring method and BG calculating formula.

In the case where the metal oxide is titanium oxide, the BG thereof can be confirmed to be from 2.7 to 3.1 eV.

The procedure for producing a dye sensitized solar cell, which is described in "Sentan Koukinouzairyo" (vol. 6, Denjikiteki Kinouzairyo 2 Denchizairyo) NGT corporation, pp 439-447), can be adopted.

The dye sensitized solar cell comprising the metal oxide structure of the present invention can be furnished with in an article having a function of generating light, heat, sound or the like or having a moving function and thereby utilized as a power source for the function in an environment under light irradiated from not only an electric lamp for illumination, such as sunlight, room light, fluorescent lamp and incandescent lamp, but also other various light sources.

In addition, the dye-sensitized solar cell of the present invention can be used as a composite charging device combined with a lithium ion battery, a chemical capacitor or an electric double layer capacitor, a composite cooling device combined with a Peltier element, or a composite display device combined with a display device such as organic EL or liquid crystal display.

The dye-sensitized solar cell of the present invention can also be produced as a composite device with a polymer cell. The polymer cell comprises at least an electrode of taking out the electron transfer accompanying the oxidation-reduction reaction of a compound as an electrical energy, and an electrolytic solution or a solid or gel electrolyte, wherein the active material for positive and negative electrodes constituting the electrode is a n-conjugated polymer and/or quinone-base compound containing a nitrogen atom, which can involve the binding/elimination of a proton in the electron transfer accompanying the oxidation-reduction reaction, the electrolytic solution or solid or gel electrolyte contains a proton, and the proton concentration in the electrolytic solution or solid or gel electrolyte and the operating voltage are controlled so that the electron transfer accompanying the oxidation-reduction reaction of the active material for positive and negative electrodes can be performed only to involve the binding/elimination of a proton bound or coordinated to the nitrogen atom or a proton of the produced hydroxyl group.

Particularly, when the electrode substrate of the dye-sensitized solar cell is made of a resin and said assembled elements and parts are arranged on a flexible substrate, the obtained composite element may be made to be flexible.

Examples of the article having a power-generating function, a light-emitting function, a heat-generating function, a sound-generating function or a moving function include power sources for building material, machine, vehicle, glass product, home appliance, agricultural material, electronic equipment, tool, tableware, bath goods, washing thing, furniture, stationery, clothing, hat, shoe, umbrella, window shade, decorative window glass, cloth product, fiber, leather product, paper product, resin product, sporting goods, bedding, container, spectacle, billboard, signboard, piping, board, pipe laying, wiring, metal fitting, illumination, signal, street light, hygiene material, automobile equipment, toy, traffic signal, road sign, ornament, outdoor product such as tent and cooler box, artificial flower, objet d'art and cardiac pacemaker.

Learning material sets and DIY sets may be produced by assembling parts which constitute production steps of said dye-sensitized solar cell or its composite element.

For example, a dye sensitized solar cell of the present invention can be installed to a bath article or equipment so as to use as an electric power source for a water boiling heater, a bathroom television, a bathroom boiled water-circulating unit or the like.

Further, a dye sensitized solar cell of the present invention can a substitute power source in all applications or articles in which an Si-type solar cell is used.

EXAMPLES

The titanium oxide-containing metal oxide structure of the present invention is described in greater detail below by referring to Examples and Comparative Examples, however, the present invention is not limited thereto.

<Preparation of Dye Solution>

In a mixed solvent containing 50 vol % of acetonitrile (guaranteed reagent, produced by Kanto Kagaku) and 50 vol % of ethanol (guaranteed reagent, produced by Kanto Kagaku), 3 mmol/liter of a ruthenium complex dye (Ru(dcbpy)$_2$(NCS)$_2$, produced by Kojima Chemical Reagents Inc.) was dissolved.

<Preparation of Electrolytic Solution>

In acetonitrile, 0.1 mol/liter of lithium iodide (produced by Kishida Chemical Co., Ltd., purity: 97%), 0.05 mol/liter of iodine (guaranteed reagent, produced by Kanto Kagaku) and 0.5 mol/liter of tetrabutylammonium iodide (produced by Acros Organics, purity: 98%) were dissolved.

<Measuring Method of Photoelectric Conversion Efficiency>

Using a xenon lamp (UXL-150D-S, manufactured by Ushio Inc.) as a light source, light of 100 mW/cm$^2$ was irradiated on a dye sensitized solar cell produced. The maximum photoelectric conversion efficiency at this time was measured by using a potentiostat (HAB151, manufactured by Hokuto Denko Corporation).

Example 1

Into a 800 cm$^3$-volume polyethylene container (φ96×133 mm) of a ball mill (AV, manufactured by Asahi Rika Seisakusho), 1.5 g of titanium oxide (supertitania (registered trademark) F-10, produced by Showa Denko K.K.) having an average primary particle size of 150 nm obtained by a vapor-phase process, 13.5 g of titanium oxide (Supertitania (registered trademark) F-5, produced by the same company) having an average primary particle size of 25 nm and 500 g of 3φ zirconia balls were charged and mixed at a rotation number of 80 rpm for 1 hour to perform a mixing mechanochemical reaction. The energy constant k1 was 15,360, the tap density of the titanium oxide structure obtained was 0.19 g/cm$^3$, and ΔBG was 0.18 eV. In this titanium oxide structure, contamination due to abrasion or the like by zirconia ball was not observed.

Into a 800 cm$^3$-volume polyethylene container (φ96×133 mm) of a ball mill, 15.0 g of the titanium oxide structure, 70 g of pure water, 10 g of ethanol and 5 g of polyethylene glycol (extra pure reagent, molecular weight: 500,000, produced by Wako Pure Chemical Industries, Ltd.) were charged and wet-mixed at a rotation number of 80 rpm for 1 hour to give an energy constant k2 of 15,360. The obtained titanium oxide structure dispersion was coated on an electrically conducting glass substrate (produced by Asahi Glass Company, Ltd.) and then baked at 500° C. for 20 minutes to form a titanium oxide thin film in a thickness of 10 to 12 μm on the electrically conducting glass substrate.

This titanium oxide thin film was immersed in the dye solution at 20 to 25° C. overnight, thereby adsorbing the dye to obtain a dye electrode. A platinum counter electrode comprising an electrically conducting glass substrate having supported thereon platinum and the dye electrode formed into a 5 mm square were fixed such that respective active surfaces faced with a spacing of 30 μm, and an electrolytic solution was poured therebetween to produce an open-type dye sensitizing solar cell. The photoelectric conversion efficiency of this solar cell was 3.1%. The measurement results of weighted average specific surface area of Particle Group B, tap density, BG after dry mixing, ΔBG and photoelectric conversion efficiency are shown in Table 1.

Example 2

A dye sensitized solar cell was produced in the same manner as in Example 1 except for changing the titanium oxides of Example 1 to 1.5 g of vapor-phase process titanium oxide (Supertitania (registered trademark) G1, produced by Showa Denko K.K.) having an average primary particle size of 250 nm, 6.8 g of vapor-phase process titanium oxide (Supertitania (registered trademark) F-4, produced by the same company) having an average primary particle size of 30 nm and 6.7 g of vapor-phase process titanium oxide (Supertitania (registered trademark) F-6, produced by the same company) having an average primary particle size of 15 nm and changing the wet-mixing time to 5 hours. The photoelectric conversion efficiency of this solar cell was 4.0%. The measurement results of weighted average specific surface area of Particle Group B, tap density, BG after dry mixing, ΔBG and photoelectric conversion efficiency are shown in Table 1.

Example 3

A dye sensitized solar cell was produced in the same manner as in Example 1 except for changing the titanium oxides of Example 1 to 3.0 g of vapor-phase process titanium oxide (Supertitania (registered trademark) F-10, produced by Showa Denko K.K.) having an average primary particle size of 150 nm, 2.0 g of vapor-phase process titanium oxide (Supertitania (registered trademark) F-5, produced by the same company) having an average primary particle size of 25 nm and 10.0 g of vapor-phase process titanium oxide (Supertitania (registered trademark) F-6, produced by the same company) having an average primary particle size of 15 nm. The photoelectric conversion efficiency of this solar cell was 4.2%. The measurement results of weighted average specific surface area of Particle Group B, tap density, BG after dry mixing, ΔBG and photoelectric conversion efficiency are shown in Table 1.

Example 4

A dye sensitized solar cell was produced in the same manner as in Example 1 except for changing the dry mixing time and wet mixing time each to 10 hours. The photoelectric conversion efficiency of this solar cell was 4.4%. The measurement results of weighted average specific surface area of Particle Group B, tap density, BG after dry mixing, ΔBG and photoelectric conversion efficiency are shown in Table 1.

Example 5

A dye sensitized solar cell was produced in the same manner as in Example 1 except for changing the titanium oxides of Example 1 to 1.5 g of vapor-phase process titanium oxide (Supertitania (registered trademark) G1, produced by Showa Denko K. K.) having an average primary particle size of 250 nm, 10.1 g of vapor-phase process titanium oxide (supertitania (registered trademark) F-4, produced by the same company) having an average primary particle size of 30 nm and 3.4 g of vapor-phase process titanium oxide (Supertitania (registered trademark) F-6, produced by the same company) having an average primary particle size of 15 nm and changing the ball mill mixing to jet mill (CP-04, manufactured by Seishin Enterprise Co., Ltd.) mixing at 20° C. and 65 MPa which was performed 5 times. The photoelectric conversion efficiency of this solar cell was 3.7%. The measurement results of weighted average specific surface area of Particle Group B, tap density, BG after dry mixing, ΔBG and photoelectric conversion efficiency are shown in Table 1.

Example 6

A dye sensitized solar cell was produced in the same manner as in Example 1 except for changing the titanium oxides of Example 1 to 1.0 g of titanium oxide (Supertitania (registered trademark) F-10, produced by Showa Denko K.K.) having an average primary particle size of 150 nm, 13.0 g of titanium oxide (Supertitania (registered trademark) F-5, produced by the same company) having an average primary particle size of 25 nm and 1.0 g of vapor-phase process zinc oxide having an average primary particle size of 30 nm. The photoelectric conversion efficiency of this solar cell was 2.7%. The measurement results of weighted average specific surface area of Particle Group B, tap density, BG after dry mixing, ΔBG and photoelectric conversion efficiency are shown in Table 1.

TABLE 1

|  | Examples | | | | | |
| --- | --- | --- | --- | --- | --- | --- |
|  | 1 | 2 | 3 | 4 | 5 | 6 |
| Weighted average specific surface area of Particle Group B [m$^2$/g] | 69 | 75 | 95 | 69 | 63 | 69 |
| Energy constant k1 [−] | 15,360 | 15,360 | 15,360 | 153,600 | — | 15,360 |
| Tap density after dry mixing [g/m$^3$] | 0.19 | 0.17 | 0.15 | 0.57 | 0.24 | 0.18 |
| BG after dry mixing [eV] | 2.9 | 2.9 | 3.1 | 2.8 | 3.0 | 2.8 |
| ΔBG between before and after dry mixing [eV] | 0.18 | 0.13 | 0.07 | 0.36 | 0.06 | 0.18 |
| Energy constant k2 [−] | 15,360 | 76,800 | 15,360 | 153,600 | 15,360 | 15,360 |
| Maximum photoelectric conversion efficiency [%] (Comparative Example 1) | 3.1 | 4.2 | 4.2 | 4.4 | 3.7 | 2.7 |

Into a 500 ml-volume polyethylene bag, 1.5 g of vapor-phase process titanium oxide (Supertitania (registered trademark) F-10, produced by Showa Denko K.K.) having an average primary particle size of 150 nm and 13.5 g of vapor-phase process titanium oxide (Supertitania (registered trademark) F-5, produced by the same company) having an average primary particle size of 25 nm were charged. Then, these powder particles were mixed by shaking 50 times. The tap density of the titanium oxide mixture obtained was 0.11 g/cm$^3$ and ΔBG was 0 eV.

Using this titanium oxide mixture, a dye sensitized solar cell was produced in the same manner as in Example 1. The photoelectric conversion efficiency of this solar cell was 2.1%. The measurement results of weighted average specific surface area of Particle Group B, tap density, BG after dry mixing, ΔBG and photoelectric conversion efficiency are shown in Table 2.

Comparative Example 2

A dye sensitized solar cell was produced in the same manner as in Example 1 except for changing the dry mixing time of Example 1 to 0.1 hour and the wet mixing time to 5 hours. The photoelectric conversion efficiency of this solar cell was 2.2%. The measurement results of weighted average specific surface area of Particle Group B, tap density, BG after dry mixing, ΔBG and photoelectric conversion efficiency are shown in Table 2.

Comparative Example 3

A dye sensitized solar cell was produced in the same manner as in Example 1 except for changing the dry mixing time of Example 1 to 5 hours and the wet mixing time to 2 hours. The photoelectric conversion efficiency of this solar cell was 2.4%. The measurement results of weighted average specific surface area of Particle Group B, tap density, BG after dry mixing, ΔBG and photoelectric conversion efficiency are shown in Table 2.

Comparative Example 4

A dye sensitized solar cell was produced in the same manner as in Example 1 except for changing the dry mixing time to 10 hours. The photoelectric conversion efficiency of this solar cell was 2.3%. The measurement results of weighted average specific surface area of Particle Group B, tap density, BG after dry mixing, ΔBG and photoelectric conversion efficiency are shown in Table 2.

Comparative Example 5

Into a 800 cm$^3$-volume polyethylene container (φ96×133 mm) of a ball mill, 1.5 g of titanium oxide (Supertitania (registered trademark) F-10, produced by Showa Denko K.K.) having an average primary particle size of 150 nm obtained by a vapor-phase process, 13.5 g of titanium oxide (Supertitania (registered trademark) F-5, produced by the same company) having an average primary particle size of 25 nm, 70.0 g of pure water, 10.0 g of ethanol, 5.0 g of polyethylene glycol (molecular weight: 500,000) and 500 g of 3φ zirconia ball were charged. Then, these were mixed at a rotation number of 80 rpm for 1 hour to obtain a titanium oxide dispersion solution. A dye sensitized solar cell was produced in the same manner as in Example 1 except for using the titanium oxide dispersion solution obtained above in place of the titanium oxide structure dispersion. The photoelectric conversion efficiency of this solar cell was 2.2%. The measurement results of weighted average specific surface of Particle Group B and photoelectric conversion efficiency are shown in Table 2.

TABLE 2

|  | Comparative Examples | | | | |
| --- | --- | --- | --- | --- | --- |
|  | 1 | 2 | 3 | 4 | 5 |
| Weighted average specific surface area of Particle Group B [m²/g] | 69 | 69 | 69 | 69 | 69 |
| Energy constant k1 [—] | — | 1,540 | 76,800 | 153,600 | 15,360 |
| Tap density after dry mixing [(g/m³)] | 0.11 | 0.10 | 0.48 | 0.57 | — |
| BG after dry mixing [eV] | 3.2 | 3.2 | 2.9 | 2.8 | — |
| ΔBG between before and after dry mixing [eV] | 0.00 | 0.00 | 0.26 | 0.36 | — |
| Energy constant k2 [—] | 15,360 | 76,800 | 30,720 | 15,360 | 15,360 |
| Maximum photoelectric conversion efficiency [%] | 2.1 | 2.2 | 2.4 | 2.3 | 2.2 |
| Industrial Applicability |  |  |  |  |  |

According to the present invention, a metal oxide structure ensuring a large adsorbed amount of sensitizing dye and smooth electron transfer, and a production method thereof are provided.

By using the metal oxide structure of the present invention, a dye sensitized solar cell having a high photoelectric conversion efficiency can be obtained and the present invention has a practical value in industry.

The invention claimed is:

1. A method for producing a metal oxide structure, comprising dry-mixing a metal oxide, wherein when an optical band gap (hereinafter referred to as "BG") of raw material metal oxide is BG0 and the BG of metal oxide after the dry mixing is BG1, the mixing is performed to give a (BG0-BG1) of 0.01 to 0.45 eV, wherein the raw material metal oxide comprises a metal oxide powder having an average primary particle size of 100 to 500 nm (hereinafter referred to as Particle Group A) and a metal oxide powder having an average primary particle size of 10 to 40 nm (hereinafter referred to as Particle Group B), the particle sizes being as converted from the specific surface area determined by the BET method, the blending ratio of Particle Group A and particle Group B being from 5/95 to 30/70 by mass, and wherein the dry mixing is performed by a ball mill and when the total mass of powder particles mixed is wp (g), the mass of medium is wm (g), the inner diameter of ball mill container is d (m), the rotation number is n (rpm) and the mixing time is t (minute), the energy constant k1 at the dry mixing represented by the following relationship:

$k1 = wm/wp \times d \times n \times t$ is from 3,000 to 250,000.

2. The method for producing a metal oxide structure as claimed in claim 1, wherein Particle Group B is a mixture of a metal oxide powder having an average primary particle size of 20 to 40 nm (hereinafter referred to as Particle Group C) and a metal oxide powder having an average primary particle size of 10 to 20 nm (hereinafter referred to as Particle Group D), the particle sizes being as converted from the specific surface area determined by the BET method.

3. The method for producing a metal oxide structure as claimed in claim 1, wherein the average specific surface area of Particle Group B is from 60 to 110 m²/g.

4. The method for producing a metal oxide structure as claimed in claim 1, wherein at least one of Particle Groups A to D is a metal oxide synthesized by a gas phase process.

5. The method for producing a metal oxide structure as claimed in claim 1, wherein the tap density is from 0.15 to 1.0 g/cm³.

6. The method for producing a metal oxide structure as claimed in claim 1, wherein the metal oxide is titanium oxide.

7. The method for producing a metal oxide structure as claimed in claim 1, wherein the metal oxide is a mixture of titanium oxide and at least one metal oxide selected from zinc oxide, niobium oxide, tantalum oxide, zirconium oxide, tin oxide and tungsten oxide.

8. The method for producing a metal oxide structure as claimed in claim 7, wherein the content of titanium oxide contained in said metal oxide mixture is 10 mass % or more.

9. A method for producing a dye sensitized solar cell, comprising including the metal oxide structure obtained by the production thereof claimed in claim 1.

* * * * *